United States Patent
Grayson (10) Patent No.: US 8,155,077 B2
(45) Date of Patent: Apr. 10, 2012

(54) ACTIVE MODE INTERNET PROTOCOL GATEWAY RELOCATION IN A PARTIAL MESHED DEPLOYMENT

(75) Inventor: Mark Grayson, Maidenhead (GB)

(73) Assignee: Cisco Technology, Inc., San Jose, CA (US)

( * ) Notice: Subject to any disclaimer, the term of this patent is extended or adjusted under 35 U.S.C. 154(b) by 257 days.

(21) Appl. No.: 11/762,976

(22) Filed: Jun. 14, 2007

(65) Prior Publication Data

US 2008/0062871 A1 Mar. 13, 2008

Related U.S. Application Data

(60) Provisional application No. 60/819,680, filed on Jul. 10, 2006.

(51) Int. Cl.
*H04W 4/00* (2009.01)

(52) U.S. Cl. ......................... 370/331; 370/328

(58) Field of Classification Search .............. 370/328, 370/255, 401, 355, 338, 331; 455/442, 452.2
See application file for complete search history.

(56) References Cited

U.S. PATENT DOCUMENTS

| | | | |
|---|---|---|---|
| 6,987,771 B2* | 1/2006 | Shimizu et al. ............. | 370/401 |
| 7,016,326 B2* | 3/2006 | Holcman et al. ............ | 370/331 |
| 7,162,246 B2* | 1/2007 | Gruet et al. ................. | 455/442 |
| 7,272,123 B2* | 9/2007 | Wall ............................ | 370/331 |
| 2002/0191573 A1* | 12/2002 | Whitehill et al. ............ | 370/338 |
| 2005/0007963 A1* | 1/2005 | Huang et al. ................ | 370/255 |
| 2005/0041650 A1* | 2/2005 | O'Neill ....................... | 370/355 |
| 2007/0225013 A1* | 9/2007 | Pflum et al. ............... | 455/452.2 |
| 2008/0013493 A1* | 1/2008 | Wu et al. .................... | 370/331 |
| 2008/0316956 A1* | 12/2008 | Turanyi et al. .............. | 370/328 |

OTHER PUBLICATIONS

U.S. Appl. No. 11/428,449, filed Jul. 3, 2006, Grayson, et al.
U.S. Appl. No. 11/428,439, filed Jul. 3, 2006, Iyer, et al.
"Draft Report of SA2 meeting #48, Verions 1.0.0.", 3 GPP TSG SA WG2 Architecture—S2™48, pp. 1-53.

* cited by examiner

*Primary Examiner* — Kwang B Yao
*Assistant Examiner* — Syed M Bokhari
(74) *Attorney, Agent, or Firm* — Baker Botts L.L.P.

(57) ABSTRACT

Methods, apparatuses and systems directed to facilitating optimized routing and mobility for communication sessions in partial mesh network deployments. According to one embodiment, routing a packet flow in a communication session includes facilitating a communication session between a first mobile node and a second mobile node. A packet flow from the first mobile node is received at a transient anchor of a visited network. The transient anchor establishes whether the packet flow is to be routed along an optimized path according to one or more routing rules. One or more of the routing rules may be based on the current cell location of the first mobile node relative to a mobility or radio coverage boundary associated with the transient anchor.

20 Claims, 7 Drawing Sheets

ACTIVE MODE INTERNET PROTOCOL GATEWAY RELOCATION IN A PARTIAL MESHED DEPLOYMENT

CROSS-REFERENCE TO RELATED APPLICATION

The present application claims priority to U.S. Provisional Application Ser. No. 60/819,680, filed Jul. 10, 2006, which is incorporated by reference herein for all purposes.

TECHNICAL FIELD

This disclosure relates generally to mobile carrier networks and routing of packet flows.

BACKGROUND

An endpoint such as a mobile node may use a system of communication networks to communicate packet flows with other endpoints. For example, a mobile node may be associated to a home network that maintains subscription information for the mobile node. If the mobile node is outside of the range of the home network, the mobile node may use a visited network to communicate packet flows.

Certain known techniques may be used to route packet flows between endpoints and through networks. These known techniques, however, are not efficient in certain situations. In certain situations, it is generally desirable to be efficient. Accordingly, signaling mechanisms have been establish that allow visited and home networks to optimally establish split policy enforcement with media flows being egressed by the visited network anchor and other flows, e.g., signaling or client-server flows, or off-net traffic to be egressed by the home network.

Several major trends are coming together to drive the adoption of packet-based radio technologies and Internet Protocol (IP)-based network architectures. There is a simultaneous desire to remove elements which process user plane data in wireless systems. Some of these new proposed architectures have a direct connection between the access point or node providing wireless protocol termination and the element providing policy enforcement. The system architecture facilitates both optimized routing of media streams and may limit the aggregated cell/transitions per second. For example, in some proposed mobile carrier architectures, a base station may provide the access layer to one or more mobile nodes, while an IP gateway may provide the distribution layer. In some proposed architectures, the base stations may be operable to directly communicate with the IP gateway or indirectly via a mesh net work of base stations. Since the upper tier policy enforcement node (such as an IP gateway) will be a mobility anchor, it will be signaled on cell transitions.

This flat hierarchy between the access point and the policy enforcement point (e.g., where the distribution and policy enforcement layers are closer to the network edge) and the possible use of optimized routing for media streams present certain challenges when considering mobility. Given the non-split nature of the IP gateway, an access point (e.g., enhanced node B) can normally be in communication with multiple IP gateways. This can allow, for instance, minimized delay in the relocation of an IP gateway for a roaming mobile node until active media streams have terminated. For example, an IP gateway may be relocated when a handset is in idle mode, since the IP gateway has no current media streams associated with the roaming mobile node to process. There may be situations, however, when the relocation of the IP gateway cannot be delayed. Examples include when a mobile node roams to a cell connected to an IP gateway that is managed by a different administrative domain (e.g., in the network of a different public land mobile network (PLMN)). In another example, transmission network restrictions may prevent the new access point from remaining in contact with the previous IP gateway.

DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

A. Overview of the Disclosure

The present invention provides methods, apparatuses and systems directed to facilitating optimized routing and mobility for communication sessions in partial mesh network deployments. According to one embodiment of the present invention, routing a packet flow in a communication session includes facilitating a communication session between a first mobile node and a second mobile node. A packet flow from the first mobile node is received at a transient anchor of a visited network. The transient anchor establishes whether the packet flow is to be routed along an optimized path according to one or more routing rules. One or more of the routing rules may be based on the current cell location of the first mobile node relative to a mobility or radio coverage boundary associated with the transient anchor. For example, if the first mobile node is located at a cell near a radio coverage boundary that, if traversed, would not allow for handover of the communications session if optimized routing were used, optimized routing may not be employed for the communications session. The packet flow is sent to the second mobile node if the packet flow is to be routed along the optimized path. The packet flow is forwarded to a permanent anchor of a home network if the packet flow is not to be routed along the optimized path.

In other implementations, the transient anchor may signal the home network of a mobile node, during an active communications session involving optimized routing, to cause renegotiation of the media stream of the communications session, if the mobile node approaches the radio coverage boundary. For example, since a mobile node may be sending media streams with a source address corresponding to the visited network, it must be informed in advance of a relocation of the transient anchor in order for it to perform application layer signaling in order to route the service data flow via the home network. Implementations of the invention allow this to be accomplished well in advance—e.g., when the user has moved into coverage cell which has a neighbor lacking full mesh support to the current transient anchor. Using an inter-operator policy interface, the visited network can indicate to the home network that its commitment to support the optimized media flow can no longer be guaranteed, triggering an application in the home network to signal the mobile node that media re-negotiation is required.

Certain embodiments of the invention may provide one or more technical advantages. A technical advantage of one embodiment may be that a transient anchor of a visited network may send a packet flow along an optimized path, which may reduce latency between endpoints. In addition, another technical advantage of one embodiment may be that, for those operators leveraging national roaming arrangements, the transient anchor can be configured to provide that optimal routing is not enabled for subscribers likely to require handover of active sessions across administrative domain boundaries.

Another technical advantage of one embodiment may be that a home policy server of the home network may provide policy rules to a visited policy server of the visited network. The policy rules may be used to select packet flows to send along the optimized path.

Another technical advantage of one embodiment may be that the transient anchor may send usage information to the home network of the mobile node. In one example, usage information is sent to the home policy server. The home policy server may apply charging rules to the usage information.

Certain embodiments of the invention may include none, some, or all of the above technical advantages. One or more other technical advantages may be readily apparent to one skilled in the art from the figures, descriptions, and claims included herein.

B. Example Carrier Network Architecture and Operation

Embodiments of the present invention and its advantages are best understood by referring to FIGS. 1 through 6 of the drawings, like numerals being used for like and corresponding parts of the various drawings.

Figure 1:
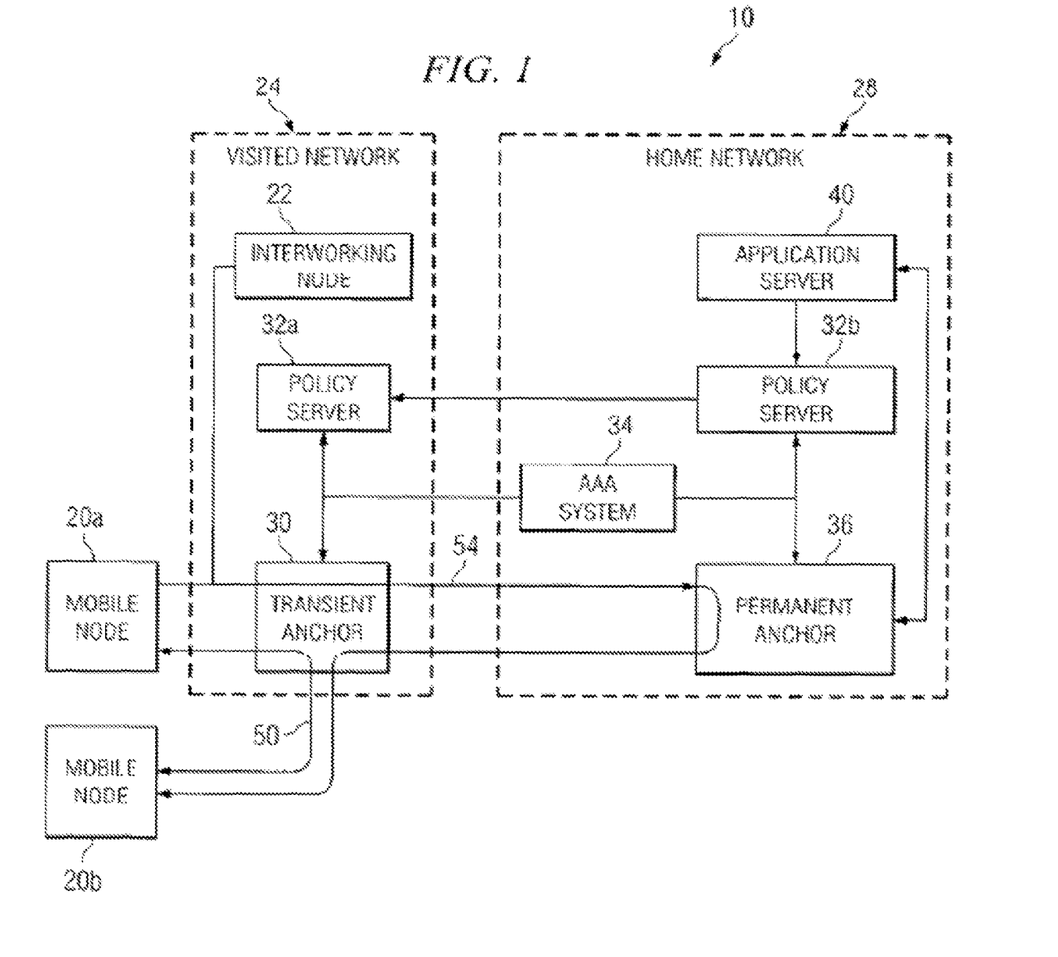
FIG. 1 is a block diagram of one embodiment of a system in which packet flows may be routed.

FIG. 1 is a block diagram of one embodiment of a system in which packet flows may be routed. According to the embodiment, certain packet flows may be routed through the transient anchor but not the permanent anchor.

According to the illustrated embodiment, system 10 operates to provide services such as communication sessions to endpoints such as mobile node 20. A communication session may refer to an active communication between endpoints, measured from endpoint to endpoint. Information is communicated during a communication session. Information may refer to voice, data, text, audio, video, multimedia, control, signaling, other information, or any combination of the preceding.

System 10 may communicate information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

A packet flow may be identified in any suitable manner. As an example, a packet flow may be identified by a packet identifier giving the source and destination of the packet flow. A source may be given by an address such as the IP address, port, or both. Similarly, a destination may be given by an address such as the IP address, port, or both.

System 10 may utilize communication protocols and technologies to provide communication sessions. Example communication protocols and technologies include those described by the Institute of Electrical and Electronics Engineers, Inc. (IEEE) 802.xx standards such as 802.11, 802.16, or WiMAX standards, the International Telecommunications Union (ITU-T) standards, the European Telecommunications Standards Institute (ETSI) standards, Internet Engineering Task Force (IETF) standards, the third generation partnerships project (3GPP) standards, or other standards.

System 10 includes communication networks. In general, a communication network may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding. As an example, a communication network may comprise a public land mobile network (PLMN).

System 10 includes components such as devices. In general, a device may include any suitable arrangement of components operable to perform the operations of the device. As an example, one or more components of system 10 may include logic, an interface, memory, other component, or any suitable combination of the preceding.

"Logic" may refer to hardware, software, other logic, or any suitable combination of the preceding that may be used to provide information or instructions. Certain logic may manage the operation of a device, and may comprise, for example, a processor. "Processor" may refer to any suitable logic operable to execute instructions and manipulate data to perform operations.

"Interface" may refer to logic of a device operable to receive input for the device, send output from the device, perform suitable processing of the input or output or both, or any combination of the preceding, and may comprise one or more ports, conversion software, or both. "Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

According to the illustrated embodiment, system 10 includes mobile nodes 20, a visited network 24, and a home network 28 coupled as shown. Visited network 24 includes a transient anchor 30 and a policy server 32a. Home network 28 includes a permanent anchor 36, a policy server 32b, and an application server 40. According to the illustrated embodiment, transient anchor 30 may route a packet flow along an optimized path 50 or a default path 54 according to a policy ride.

According to one embodiment, a mobile node 20 represents any suitable device operable to communicate with a communication system. Mobile node 20 may comprise, for example, a personal digital assistant, a computer such as a laptop, a cellular telephone, a mobile handset, or any other device operable to communicate with system 10.

Visited network 24 represents a communication network that facilitates a communication session for mobile node 20a within the range of visited network 24, and may be accessed through a radio access network. Visited network 24 may include a foreign agent that provides mobile node 20a with an address to which flows for mobile node 20a may be forwarded.

In general, an anchor processes signaling in communications session. Transient anchor 30 processes signaling from mobile node 20a while mobile node 20a is being served by visited network 24. Transient anchor 30 may comprise any suitable device, for example, a General Packet Radio Services (GPRS) Support Node (GSN) or a mobile IPv6 node. Transient anchor 30 may also commit resources and maintain gateways for packet flows in visited network 24. These operations may be performed according to any suitable technique, for example, an IP Multimedia Subsystem (IMS) technique.

According to one embodiment, transient anchor 30 may perform optimized routing. That is, transient anchor 30 may route a packet flow along an optimized path 50 through transient anchor 30 or a default path 54 through transient anchor 30 and permanent anchor 36 according to a policy rule. Transient anchor 30 may configure a path for selected flows through a gateway of visited network 24 to route the flows along optimized path 50.

Figure 1A:
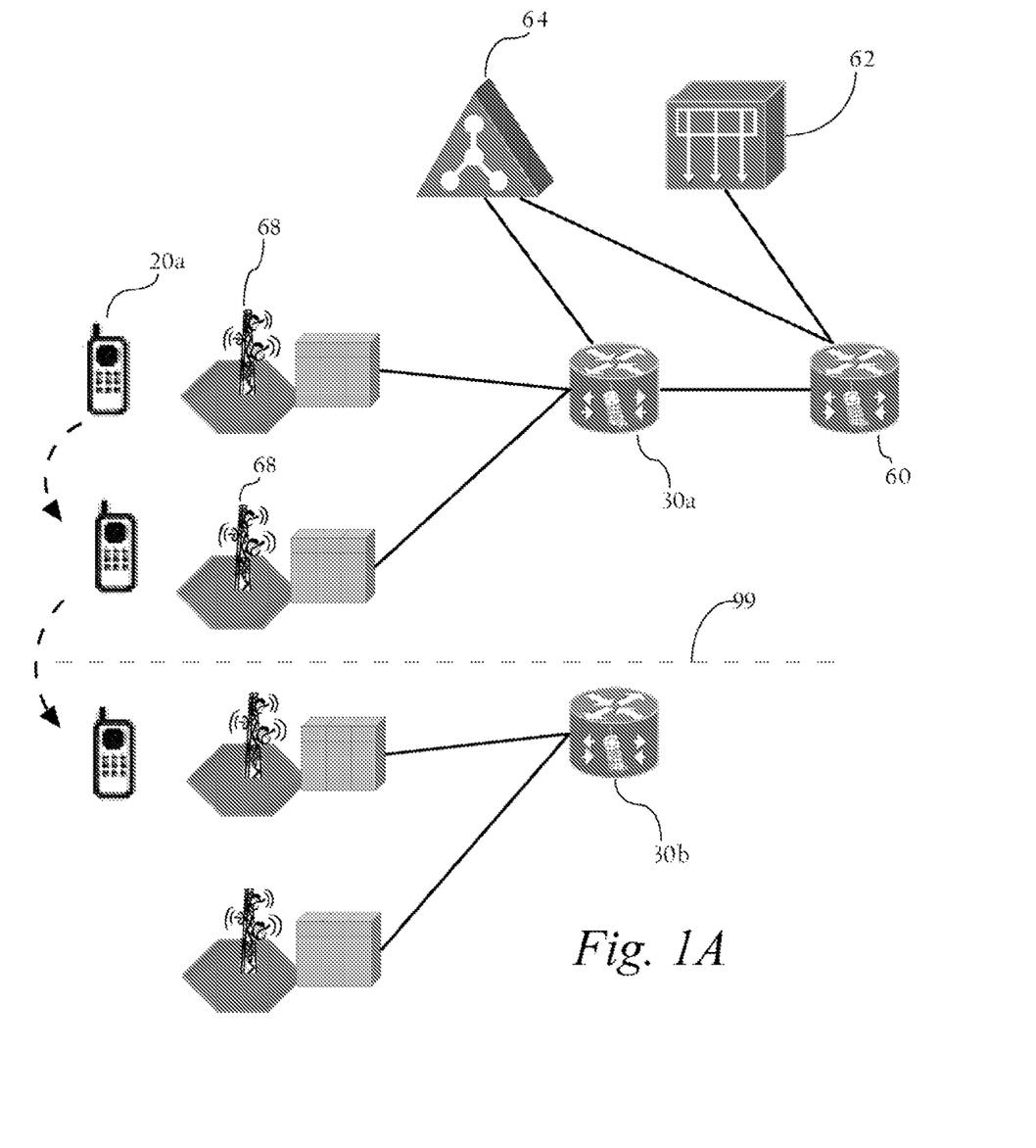
FIG. 1A is a schematic diagram illustrating elements of an example visited network.

FIG. 1A illustrates various components of a visited network according to one possible implementation of the invention. In the embodiment illustrated in FIG. 1A, the transient anchor may be an IP gateway 30a. In the illustrated network, the visited network access layer functions may be implemented by one or more base transceiver stations 68. Base transceiver stations 68 include one or more radio transceivers defining a cell of radio coverage for mobile nodes, such as mobile node 20a. Further, the visited network may comprise one or more IP gateways 30a implementing a distribution layer to handle packet flow routing, policy application or enforcement, and inter-cell handoffs responsive to roaming events. In the illustrated network, IP gateway 30a functions as the first Layer 3 entity from the perspective of the mobile nodes, and functions as the Layer 3 demarcation from the Layer 2 Radio Access Network (RAN).

IP gateway 30a may also provide an authenticator function, including support for fast re-authentication on handoff and the capability to not require full re-authentications during handoff. For example, IP gateway 30a may include an EAP authenticator for access authentication. The EAP authenticator exchanges authentication over EAP with a key manager. A default gate is enabled that blocks all access via the IP Gateway 30a until successfully authenticated. At the end of the authentication procedures, sufficient information for client bootstrapping may be obtained. This information may include information such as the Home Link Prefix, the Home IP Gateway 30b address, and in some cases, the Home Policy Server 32b address. At the end of EAP authentication, the Master Session Key (MSK) may be communicated via the IP Gateway 30a to the radio access node, for use in encrypting the airlink. As the first layer 3 access router, it may provide support for IPv6 auto-configuration. Address assignment for IPv6 clients can use industry-standard mechanisms. The IP gateway 30a may also support network-based mobility by utilizing 'Layer 2 handoff hints' to facilitate fast handoff, thereby reducing handover latency.

The visited network may further comprise core function elements which support policy and charging enforcement functions (e.g., pushing policies for packet flows to IP gateway 30a). As FIG. 1A illustrates, as mobile node 20a roams across cells, IP gateway 30a may continue to be the anchor for mobile node 20a, until the mobile node 20a crosses a radio coverage boundary 99 defined by the individual cell coverage areas of the base stations 68 logically associated with IP gateway 30a. Depending on the network topology, IP gateway 30a may handover mobile node 20a to IP gateway 30b during an active communications session; however, in some instances, when optimized routing is used this may not be possible. As discussed in more detail below, visited network may, in such instances, signal the home network to re-negotiate the communications session to use a default routing scheme that permits a handoff to IP gateway 30b. Still further, as discussed below, the visited network may avoid optimized routing for a given communications session if the mobile node 20a is in proximity to a radio coverage boundary 99.

According to one embodiment, transient anchor 30 may track usage of visited network 24 by mobile node 20a and may provide this usage information to home network 28. Optimized routing may be performed in any suitable manner. Examples of methods for routing packet flows are described in more detail with reference to FIGS. 2 and 3.

A policy server 32 manages policy rules and provides the policy rules to an anchor 30 or 36. According to the illustrated embodiment, policy server 32a provides policy rules to transient anchor 30, and policy server 32b provides policy rules to permanent anchor 36. Policy server 32a may receive policy rules from policy server 32b of home network 28.

In general, a rule may specify an action to be taken if a trigger event occurs, and may be subject to a condition. Policy rules may include routing rules, charging rules, quality of service rules, usage tracking rules, other suitable rules, or any combination of the preceding, and may be associated with a particular flow. A routing rule may specify how to route a packet flow. For example, an optimized routing rule may specify a packet flow that is to be routed on optimized path 50 or default path 54 based on the type of packet flow. For example, a rule may specify that if packet flow has a particular path identifier, then the packet flow to be routed along optimized path 50. Otherwise, the packet flow is to be routed along default path 54.

Any suitable optimized routing rule may be used. As a first example, an optimized routing rule may specify that if the mobile nodes 20 engaged in a communication session are being serviced by the same visited network 24, then use optimized path 50. As a second example, an optimized routing ride may specify that if there is not an appropriate relationship between visited network 24 and home network 28, then use default path 54. As a third example, an optimized routing rule may specify that if high security that can only be provided by home network 28 is required, then use default path 54. As discussed below, the optimized routing rules may also be configured to depend on the cell location of the mobile node 20a both during initiation of a communications session and while roaming.

A charging rule may specify how to charge an account. As a first example, a charging ride may specify that if there is a certain amount of usage, then the account is to be charged a predetermined amount. As a second example, a charging rule may specify that account is to be charged at a zero rate. As a third example, a charging rule may specify that a charging server should be contacted for a quote or request. As a fourth example, a charging rule may specify a charging identifier used to identify an account of mobile node 20a.

A quality of service rule may specify how packet flows should be handled based on their quality of service. A usage tracking rule may specify how to measure usage of a network by mobile node 20a. Usage may be measured using any suitable parameters, for example, duration of a communication session, duration of the subscription, amount of packets communicated, other parameter, or any combination of the preceding.

Home network 28 represents a communication network that maintains a subscription for mobile node 20a. The subscription may include an account that is charged based upon usage by mobile node 20a. Home network 28 includes a Permanent Anchor 36 that maintains the address of mobile node 20a and forwards packets to mobile node 20a.

Home network 28 may maintain subscription information such as subscriber information. Subscriber information may include one or more identifiers for the subscription. As an example, the identifiers may include an account identifier that uniquely identifies the account associated with the subscription. The account identifier may be used to charge the account based upon usage by mobile node 20a.

Application Server 40 processes signaling from mobile node 20a. According to one embodiment, Policy Server 32b may establish whether transient anchor 30 supports optimized routing. Application Server 40 may query Policy Server 32b to determine if transient anchor 30 supports optimized routing. Application Server 40 notifies transient anchor 30 of the packet flows that may be routed along optimized path 50. Application Server 40 may, for example, have policy server 32b send policy rules, including an optimized routing rule, to policy server 32a, which in turn sends the rules to transient anchor 30. Application server 40 may specify the charging rules for a communication session.

Modifications, additions, or omissions may be made to system 10 without departing from the scope of the invention. For example, system 10 may include an authorization server operable to provide services for authentication, authorization, accounting, or any suitable combination of the preceding.

The components of system 10 may be integrated or separated according to particular needs. Moreover, the operations of system 10 may be performed by more, fewer, or other modules. Additionally, operations of system 10 may be performed using any suitable logic comprising software, hardware, other logic, or any suitable combination of the preceding. As used in this document, "each" refers to each member of a set or each member of a subset of a set.

Figure 2:
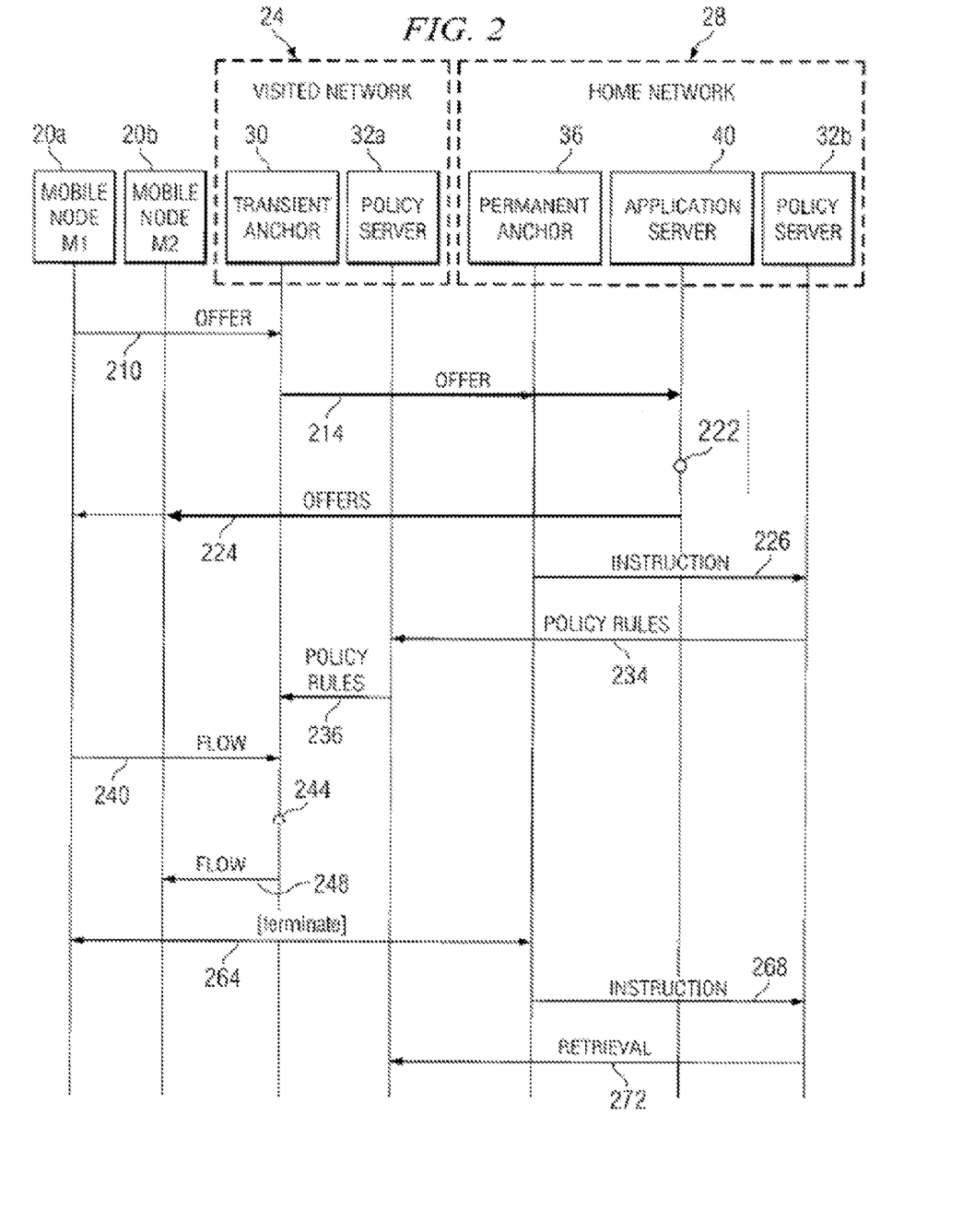
FIG. 2 is a call flow diagram illustrating one embodiment of a method for routing packet flows that may be used with the system of FIG. 1.

FIG. 2 is a call flow diagram illustrating one embodiment of a method for routing packet flows that may be used with system 10 of FIG. 1. According to the illustrated embodiment, mobile nodes 20a and 20b have identifiers M1 and M2, respectively. Mobile node M1 has M1 home network 28 and is visiting M1 visited network 24. Mobile node M1 is engaged in a communication session with mobile node M2, which has its own M2 home network and M2 visited network.

Steps 210 through 224 describe a media negotiation process to negotiate paths, for example, optimized path 50 or default path 54, on which to communicate media packet flows. The negotiation process may be conducted according to any suitable procedure, for example, a Session Description Protocol (SDP) offer/answer procedure using Session initiation Protocol (SIP) signaling. As an example, an offer may indicate the types of media packet flows that may be sent by a sender, and a response may indicate types of media flows supported by the receiver and the paths over which the packet flows may be sent.

Visited Network 24 may be operable to indicate to Home Network 28 whether Visited Network 24 supports optimized routing. In one embodiment this indication can use an authentication, authorization, and/or accounting (AAA) link between the Transient Anchor 30 of Visited Network 24 and Home Network 28. In such an embodiment, when a Mobile Node 20 establishes an association, the Transient Anchor 30 will trigger the establishment of an AAA session with the home network 28. The Transient Anchor 30 will send an AAA session establishment request to Policy Server 32a. The establishment request will include information sufficient for the Policy Server 32a to determine the identity of Policy Server 32b. In one embodiment, the Transient Anchor 30 includes the International Mobile Subscriber Identity (IMSI) of Mobile Node 20 in its AAA establishment request, which Policy Server 32a can map to a Domain Name. The Policy Server 32a will then send an AAA session establishment request to Policy Server 32b. In one embodiment, this establishment request can include information as to the capabilities of Visited Network 24 and may indicate whether Visited Network 24 supports optimized routing of media. Home network 28 may indicates its capabilities, such as support for optimized routing, in responsive messages.

In another embodiment, this indication can use SIP signaling between Visited Network 24 and Home Network 28. In such an embodiment, Mobile node M1 sends an offer to Application Server 40 via M1 transient anchor 30 of M1 visited network 30 at step 210. M1 transient anchor inserts information into the offer and forwards the offer to Application Server 40 via permanent anchor 36 of M1 home network 28 at step 214. The information may inform Application Server 40 of the care-of address of M1 transient anchor and the capability of M1 visited network 24 to perform optimized routing. Mobile node M2 sends an offer to M1 home network 28 at step 218.

Application Server 40 may be operable to query the Policy Server 32b to determine whether optimized routing is supported by Visited Network 24 (e.g., in the case of AAA signaling). Hence, Application Server 40 establishes that optimized routing may be used according to an optimized routing rule at step 222. The determination may be made based on the optimized routing capability of M1 visited network 24, policy rules, other factor, or any suitable combination of the preceding. Application Server 40 forwards the offer from mobile node M1 to mobile node M2 and the offer from mobile node M2 to mobile node M1 at step 224.

Application Server 40 instructs policy server 32b of M1 home network 28 to send policy rules to policy server 32a of visited network 24 at step 226. The home network may include a subscriber identity and which types of flows are authorized to be optimized for the identified subscriber. The policy rides may include routing rules and usage tracking rules. The routing rules may include an optimized routing rule that specifies packet flows to be routed along optimized path 50. A packet flow may be specified using a packet flow identifier given by the source and destination of the packet flow. For example, the optimized routing rule may specify that packet flows with an identifier given by mobile node M1 as the source and mobile node M2 as the destination and packet flows with an identifier given by mobile node M2 as the source and mobile node M2 as the destination should be routed along optimized path 50.

Policy server 32b provides the policy rules to policy server 32a at step 234. Policy server 32b may provide the policy rules in any suitable manner. For example, policy server 32b may discover policy server 32a using policy proxy discovery procedures. The visited network will implement one or more of the requested policies and confirm to the home network with a signaling. As discussed below, if the policy rides transmitted from policy server 32b request optimized routing for a communications session, policy server 32a may itself apply one or more policy rules to determine whether to accept the request (see FIG. 5). The rules may then be pushed to the access gateway of visited network 24 that is supporting mobile node M1. The policy rules are provided to transient anchor 30 at step 238.

Mobile node M1 sends a packet flow for mobile node M2 to transient anchor 30 at step 240. Transient anchor 30 determines that the packet flow is to be routed along optimized path 50 at step 244. The determination may be made according to the optimized routing rule. Transient anchor 30 sends the packet, flow to mobile node M2 instead of to permanent anchor 38 at step 248 to route the packet flow along optimized path 50.

The communication session terminates at step 264. M1 permanent anchor 36 instructs policy server 32b to retrieve the policy rules from policy server 32b at step 288. Policy server 32b retrieves the policy rules at step 272. After retrieving the rules, the method terminates.

Figure 5:
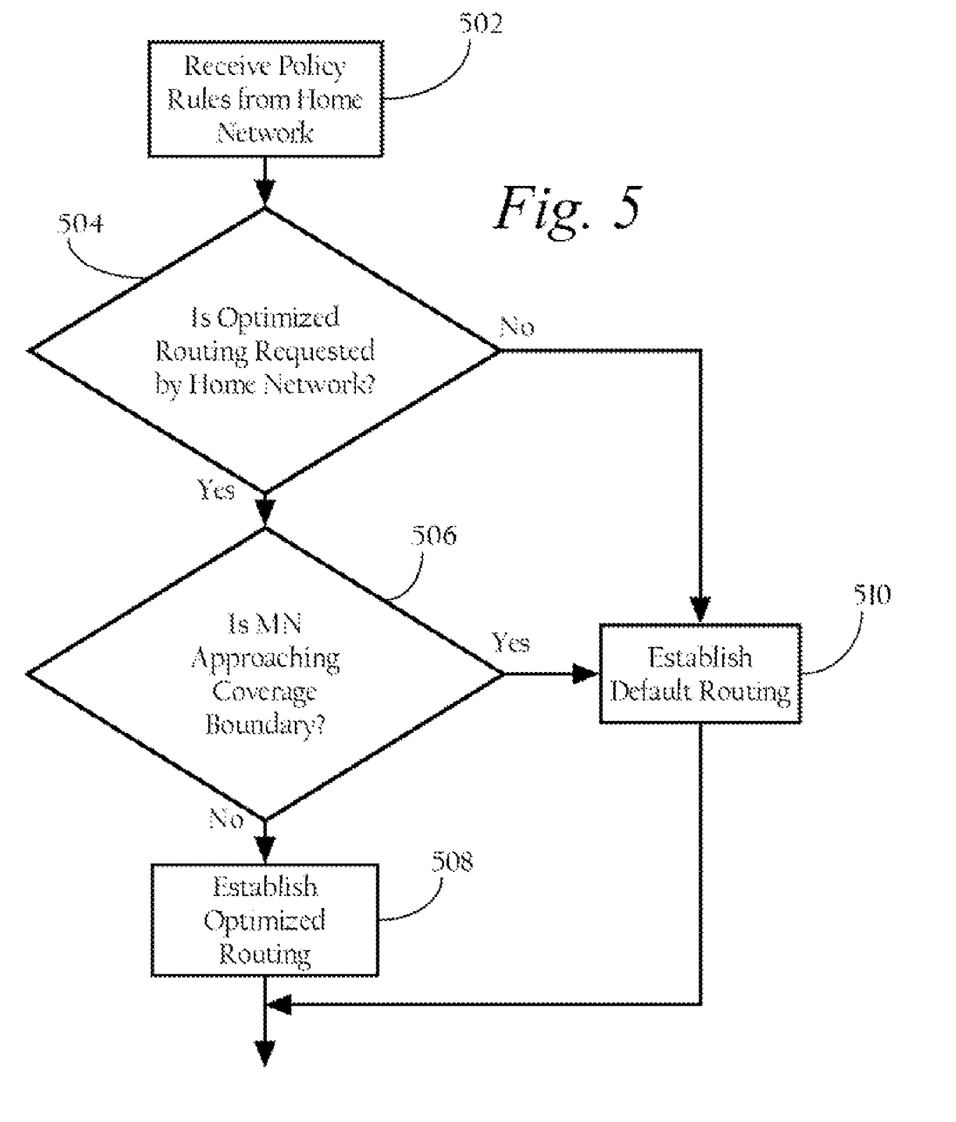
FIG. 5 is a flow chart setting forth an example method for determining whether to route packet flows along an optimized path.

FIG. 5 illustrates a method that can be implemented by policy server 32a of the visited network responsive to receiving policy rules for a communications session from policy server 32b. Alternatively, IP gateway 30a may implement the method when policy server 32a pushes policy rules to it. As FIG. 5 shows, when the visited network 24 receives one or more policy rules from policy sewer 32b (502), visited network 24 may determine whether the policy rule(s) requests optimized routing for the communications session (504). If so, visited network 24 identify the cell location of the mobile node 20a and access a cell location map to determine whether to establish optimized routing for the communications session (506).

Figure 4:
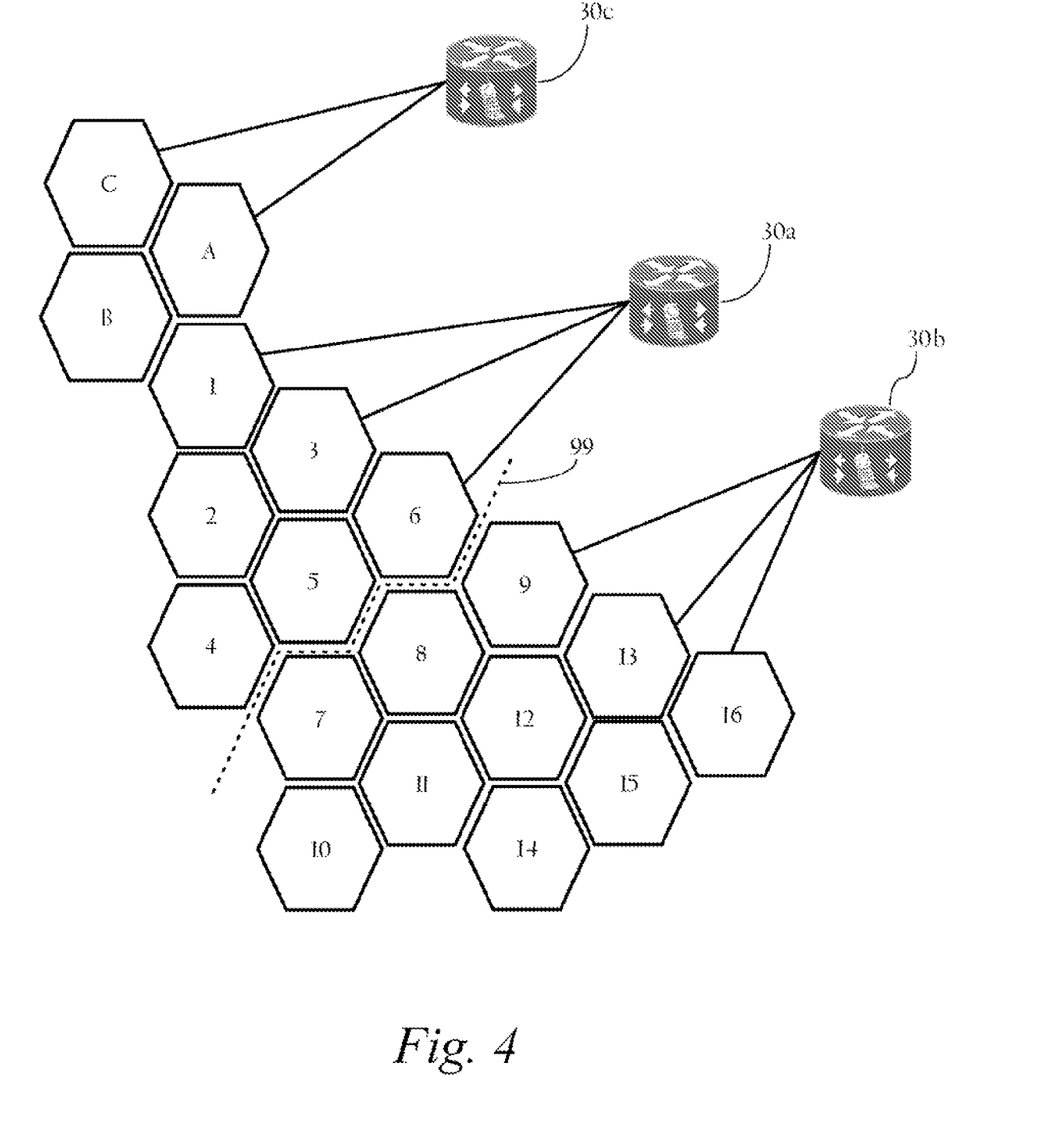
FIG. 4 is a schematic diagram illustrating the cell coverage regions and borders of a mobile carrier network having a partial mesh topology.

FIG. 4 graphically illustrates the concept of a cell location map according to one possible implementation of the invention. Visited network 24 maintains a cell location map comprising a geographic map of its cells (each implemented by corresponding base station transceivers) and connectivity of these cells to corresponding IP gateways (e.g., 30a and 30b). In the illustrated cell location map, cells 1-6 are connected to IP gateway 30a, while cells 7-16 are connected to IP gateway 30b. IP gateways 30a and 30b do not have connectivity or otherwise have the ability to handover mobile nodes during active communications sessions where optimized routing is used. For example, IP gateways 30a and 30b may correspond to different administrative domains. In the illustrated embodiment, however, IP gateways 30a and 30c are in the same administrative domain and allow for handover of active communications sessions when optimized path routing is employed. The cell location map also indicates those cells on an IP gateway coverage border 99 (e.g., cells 4-6 of IP gateway 30a) and also those cells which border the border cells (e.g., cells 2 and 3 of IP gateway 30a). As discussed above, if optimized routing is requested by the home network, visited network 24 confirms the cell location of the mobile node 20a before confirming optimized routing to the home network. In the implementation shown, the visited network compares the current cell of the mobile node 20a with its topology database. If the mobile node 20a is in a border cell (e.g., cells 4-6) or a border of a border cell (e.g., cells 2 & 3), then the visited network 24 denies the request for optimized routing of the media stream indicating an appropriate cause in a signaling message to the home network. In the above example, a mobile node in cells 2-6 would not receive optimized handling and/or policy enforcement for its communications sessions. Instead, default routing, which typically involves the home network anchor, can be used to provide for mobility across the radio coverage boundary 99 dining active communications sessions. The optimized routing rule described above is premised on the likelihood that a mobile node 20a in a border of border cell or border cell is likely to cross the radio coverage border 99, which defines a mobility boundary for active communications sessions when optimized path routing is employed. Other policy rules can be used. For example, a policy ride can be created that denies optimized routing if the mobile node 20a is on a border cell, but otherwise allow optimized routing. Other policy rules can also incorporate the detected trajectory of the mobile node 20a within the coverage area and relative to the radio coverage border 99. Referring back to FIG. 5, if the optimized routing policy is satisfied, visited network 24 configures transient anchor 30 to use an optimized route 50 for the media stream of the communications session (508); otherwise, transient anchor 30 is configured to use default route 54 (510). In either case, the selected route is communicated to home network 28 in a signaling message.

Figure 6:
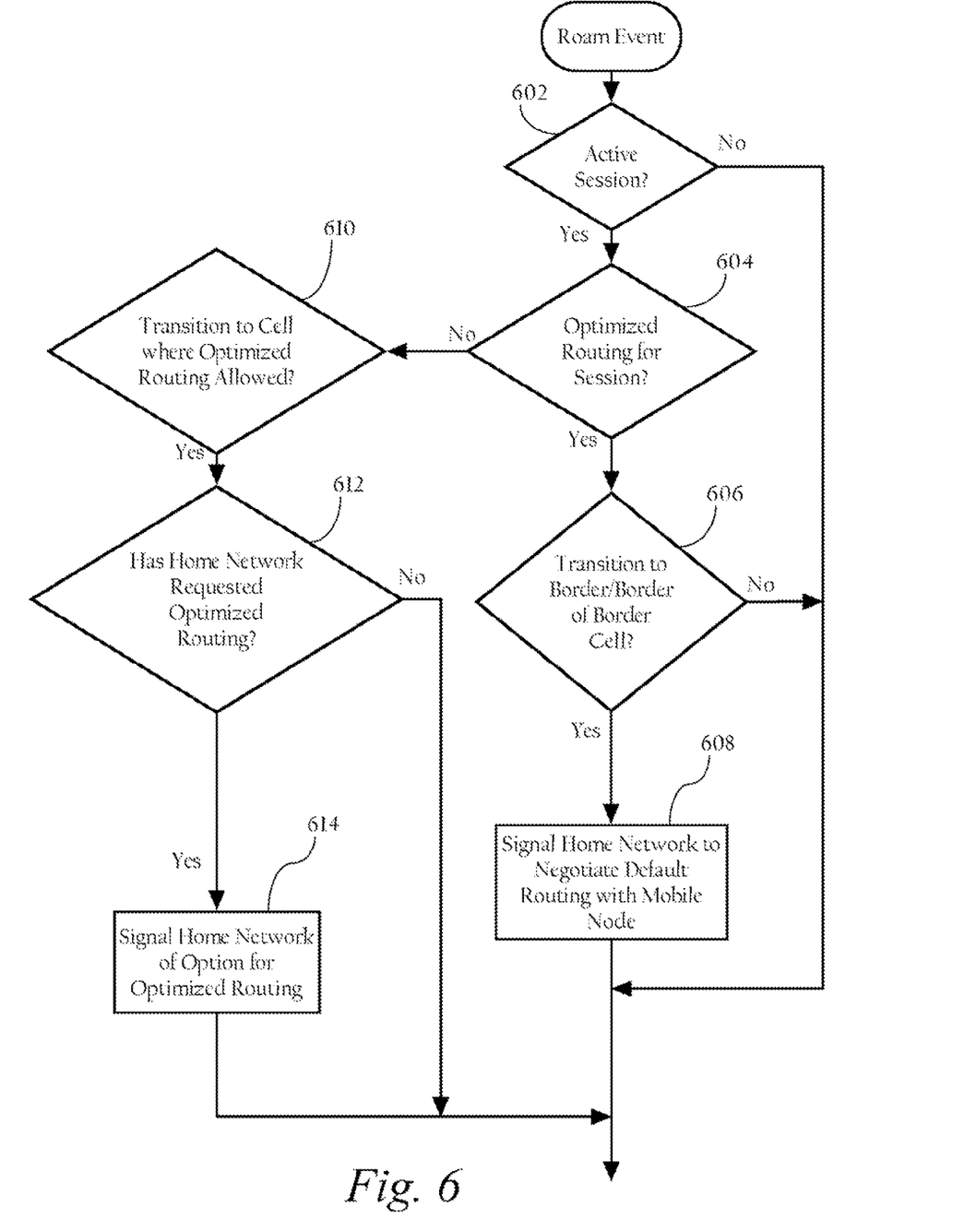
FIG. 6 is a flow chart illustrating an example method directed to conditionally signaling a home network of an endpoint in connection with roaming in a visited network.

Additionally, roaming activity of the mobile node 20a may cause visited network 24 to signal home network to either re-negotiate the media path of the communications session or to indicate the availability of optimized routing for the communications session. FIG. 6 illustrates a decision flow that is applied in response to a roam event associated with mobile node 20a. As FIG. 6 provides, if mobile node 20a is engaged in an active communications session (602), IP gateway 30a may determine whether optimized routing is being used for the communications session (604). If so, IP gateway 30a signals home network 28 to cause the mobile node to re-negotiate the media stream of the communications session (608), if the mobile node 20a has transitioned to a border cell or border of border cell (606). When signaled by visited network 24, home network 28 may signal mobile node 20a by appropriate means and trigger the re-negotiation of the media stream. In one embodiment, mobile node 20a may re-negotiate the media stream of the session by sending a re-invite with SDP including IP addresses allocated by the home network 28. IP gateway 30a can be reconfigured not to perform optimized routing and/or policy enforcement on the communications session. Since the home network 28 is now responsible for media transport, the communications session may continue uninterrupted.

Additionally, as FIG. 6 illustrates, if the mobile node 20a transitions from a border cell or border of border cell into an inner region cell (e.g., cell 1) (610), IP gateway 30a may signal home network 28 of the option to establish optimized routing for the communications session (614). In one embodiment, this signaling is conditioned on the home network 28 having previously requested optimized routing for the communications session during initiation of the communications session (612). When signaled, the home network 28 can then decide whether to establish optimized routing (by causing the mobile node to re-negotiate the session) or to maintain default routing for the session.

Use of the methods described above may be detected by analyzing the protocol used to manage roaming. Use of the method may also be detected by reviewing service activation and session description protocol (SDP) communication between visited network 24 and home network 28.

Modifications, additions, or omissions may be made to the method without departing from the scope of the invention. The method may include more, fewer, or other steps. Additionally, steps may be performed in any suitable order without departing from the scope of the invention.

Figure 3:
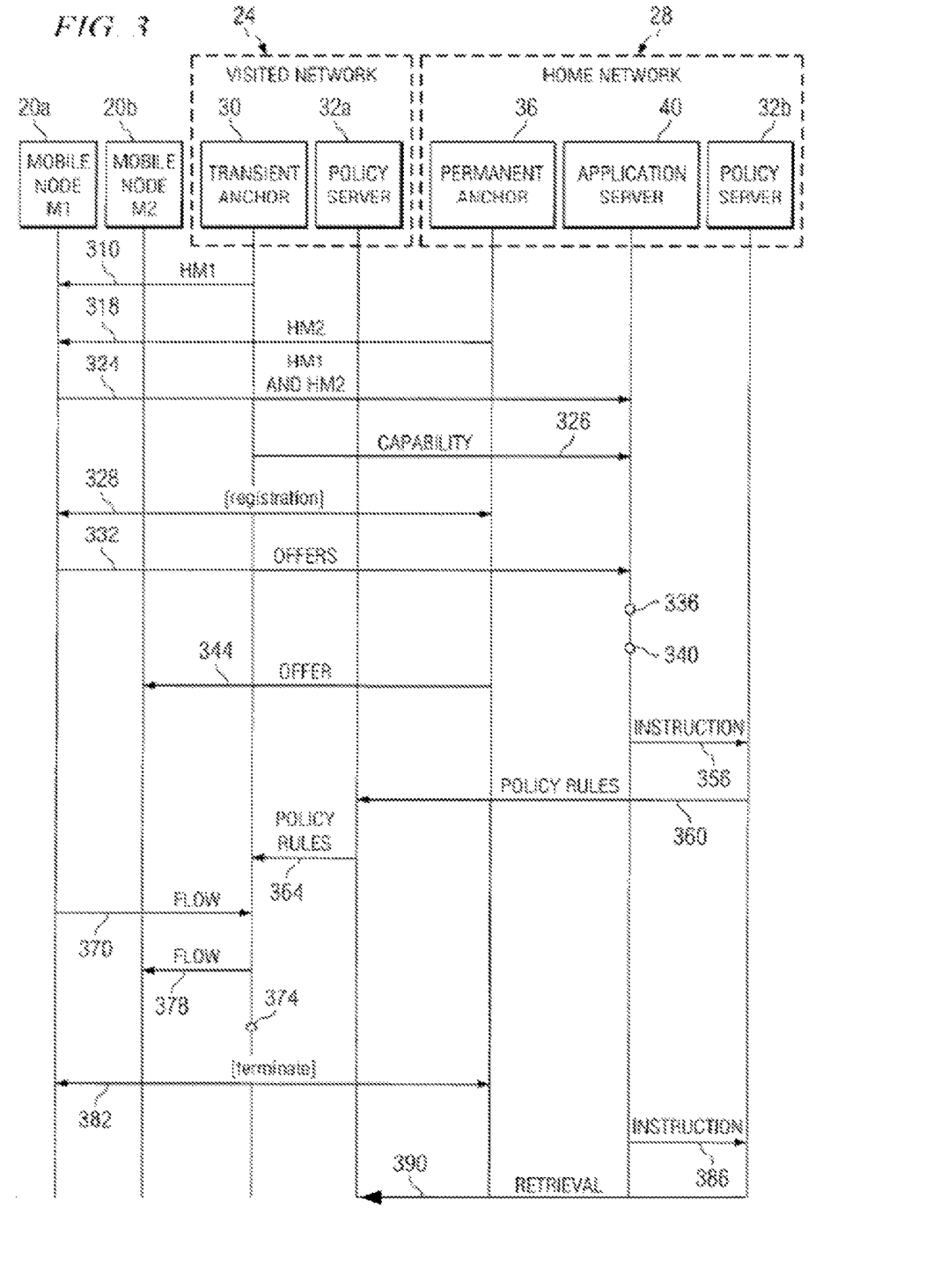
FIG. 3 is a call flow diagram illustrating another embodiment of a method for routing packet flows that may be used with the system of FIG. 1.

FIG. 3 is a call flow diagram illustrating another embodiment of a method for routing packet flows that may be used with system 10 of FIG. 1. According to the illustrated embodiment, mobile nodes 20a and 20b have Identifiers M1 and M2, respectively. Mobile node M1 has M1 home network 28 and is visiting M1 visited network 24. Mobile node M1 is engaged in a communication session with mobile node M2, and has its own M2 home network and M2 visited network.

Mobile node M1 receives a visitor IP address VM1 assigned by M1 visited network 124 at step 310, and receives a home IP address HM1 assigned by M1 home network 128 at step 318. Mobile node M1 may also recover the address of a proxy call session control function (P-CSCF) of M1 home network 28.

Mobile node M1 informs M1 permanent anchor 36 of M1 home network 28 of the assigned IP addresses at step 324. M1 transient anchor 30, depending on the current location of the mobile node, may inform Home Subscription Service (SSS) of Home Network 28 of the capability of M1 visited network 24 to perform optimized routing at step 326. More specifically, as discussed above, M1 transient, anchor 30 may determine the current cell location of the mobile node (see above) and conditionally signal the availability of optimized routing depending on the location and one or more policy rules. The IP addresses and capability information may be sent in any suitable manner, for example, in an AAA message sent via Policy Server 32a and Policy Server 32b. The IP addresses may be included as framed IP addresses. The AAA message may be proxied using authentication, authorization, and/or accounting (AAA) techniques towards the home subscription service (HSS) of home network 28.

Mobile node M1 registers with M1 home network 28 at step 328. The registration may be performed in any suitable manner. As an example, mobile node M1 may register with a serving call session control function (S-CSCF). The S-SCSF may obtain information from the home subscription service describing the assigned IP addresses and the optimized routing capability of M1 visited network 24. The indication may be made in any suitable manner, for example, using a P-header in a 200 OK register message.

Steps 332 through 344 describe a media negotiation process to negotiate paths, for example, optimized path 50 or default path 54, on which to communicate media packet flows. The negotiation process may be conducted according to any suitable procedure. Mobile node M1 sends offers representing optimized path 50 and default path 54 at step 332. An optimized path offer representing optimized path 50 may include the visited IP address VM1, and a default path offer representing default path 54 may include the home IP address HM1. Mobile node 20a sends the offers through M1 transient anchor 30 to M1 permanent anchor 36. M1 transient anchor 30 caches the source addresses of the offers. In one implementation, M1 transient anchor 30 may discard the optimized path offer depending on the current cell location of the mobile node 20a (see above).

M1 home network 28 establishes whether optimized routing should be performed at step 336. The determination may be made based on the optimized routing capability of M1 visited network 24, policy rules, other factor, or any suitable combination of the preceding. The determination may be made by any suitable device of home network 28, for example, the S-SGSF and/or the Service Capability Interaction Manager (SCIM). The S-SCSF and/or SCIM may also confirm that the offers are associated with the appropriate addresses. However, as discussed above, M1 network 28 may only receive the default path offer, in which case this determination is not made.

Assuming both default and optimized path offers are received at home network, a path is selected by removing one of the offers at step 340. If optimized routing is to be performed, the default path offer may be removed. If optimized routing is not to be performed, the optimized path offer may be removed. Permanent anchor 36 may also establish whether the offer corresponds to the home or visited network IP address. M1 permanent anchor 36 routes the offer to mobile node M2 at step 344.

M1 permanent anchor 36 instructs policy server 32b of M1 home network 28 to send policy rules to policy server 32b of visited network 24 at step 356. The instruction may be performed in any suitable manner. For example, M1 permanent anchor 36 may send the SIP message source address and the SDP offer source address to policy server 32b. The SIP message source address includes the home IP address HM1. The SDP offer source address includes the visited IP address VM1 if optimized routing is being performed, and the home IP address HM1 if default routing is being performed. That is, the addresses match if optimized routing is being used, and the addresses do not match if default routing is being used.

Policy server 32b compares the SIP message source address and the SDP offer source address to determine if optimized or default routing is being used. If optimized routing is being used, policy server 32a of visited network 24 may be used to implement policy rules.

Policy server 32b provides the policy rules to policy server 32a at step 360. Policy server 32b may provide the policy rides in any suitable manner, for example, as described with reference to FIG. 2.

Mobile node M1 sends a packet flow for mobile node M2 to transient anchor 30 at step 370. Transient anchor 30 determines that the packet flow is to be routed along optimized path 50 at step 374. The determination may be made according to the optimized routing rule. Transient anchor 30 sends the packet flow to mobile node M2 instead of to permanent anchor 36 at step 378 to route the packet flow along optimized path 50.

The communication session terminates at step 382. M1 permanent anchor 36 instructs policy server 32b to retrieve the policy rules from policy server 32b at step 386. Policy server 32b retrieves the policy rules at step 390. After retrieving the rules, the method terminates.

Use of this method may be detected by analyzing the protocol used to manage roaming. Use of the method may also be detected by reviewing service activation and session description protocol (SDP) communication between visited network 24 and home network 28.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art. It is therefore not intended that the present invention be limited to the embodiments described above.

What is claimed is:

1. A method comprising
receiving, at a transient anchor of a visited network, a message from a first endpoint requesting initiation of a communications session between the first endpoint and a second endpoint;
identifying an access node to which the first endpoint is connected;
determining whether packet flows of the communications session are to be routed along an optimized path based, at least in part, on the proximity of the access node relative to a mobility border associated with the transient anchor, wherein the mobility border defines a coverage boundary beyond which handoffs of active communications sessions of the first end point traversing the optimized communications path from the transient anchor to a second transient anchor is unavailable;

forwarding the packet flows of the communications session between the first end point and the second endpoint along the optimized path, if the packet flows are to be routed along the optimized path, wherein the optimized path bypasses a permanent anchor of a home network of the first endpoint; and forwarding the packet flows of the communications session between the first end point and the second endpoint to the permanent anchor of the home network of the first endpoint, if the flows are not to be routed along the optimized path.

2. The method of claim 1 further comprising receiving from a home network policy server of the first endpoint associated with the transient anchor of the visited network one or more policy rules relating to a communications session between the first endpoint and the second endpoint.

3. The method of claim 2 configuring the transient anchor to forward the packet flows of the communications session between the first end point and the second endpoint along the optimized path, if the packet flows are to be routed along the optimized path;

configuring the transient anchor to forward the packet flows of the communications session between the first end point and the second endpoint to a permanent anchor of a home network of the first endpoint, if the flows are not to be routed along the optimized path.

4. The method of claim 1 wherein the mobility border is defined by a physical radio coverage border comprising individual radio coverage areas of a plurality of access nodes associated with the transient anchor.

5. The method of claim 1 wherein a cell topology map is associated with the transient anchor, the cell topology map defining the relative locations of access nodes having connectivity to the transient anchor; the cell topology map further identifying one or more border access nodes of the access nodes at the border of the aggregate radio coverage area defined by the access nodes; the topology map further identifying the border of border access nodes physically adjacent to the border nodes; and wherein the determining step includes determining that the optimized path is to be used for the communications session, if the identified access node is not a border access node or a border of border access node; else, determining that a default path including the permanent anchor of a home network of the first endpoint is to be used for the communications session.

6. The method of claim 1 further comprising forwarding the message to the home network of the first endpoint; and receiving from a home network policy server of a first endpoint associated with a transient anchor of a visited network one or more policy rules relating to the communications session between the first endpoint and a second endpoint.

7. The method of claim 1 further comprising responsive to a roam event of the first endpoint from the identified access node to a second access node, conditionally signaling the home network of the first endpoint to re-negotiate a path for the communications session based at least in part on the location of the second access node relative to the mobility border associated with the transient anchor.

8. Logic encoded in one or more non-transitory, tangible media for execution and when executed operable to:

receive, at a transient anchor of a visited network, a message from a first endpoint requesting initiation of a communications session between the first endpoint and a second endpoint;

identify an access node to which the first endpoint is connected;

determine whether packet flows of the communications session are to be routed along an optimized path based, at least in part, on the proximity of the access node relative to a mobility border associated with the transient anchor, wherein the mobility border defines a coverage boundary beyond which handoffs of active communications sessions of the first end point traversing the optimized communications path from the transient anchor to a second transient anchor is unavailable; and forward the packet flows of the communications session between the first end point and the second endpoint along the optimized path, if the packet flows are to be routed along the optimized path, wherein the optimized path bypasses a permanent anchor of a home network of the first endpoint; else, forwarding the packet flows of the communications session between the first end point and the second endpoint to the permanent anchor of the home network of the first endpoint.

9. The logic of claim 8 wherein the mobility border is defined by a physical radio coverage border comprising individual radio coverage areas of a plurality of access nodes associated with the transient anchor.

10. The logic of claim 8 wherein a cell topology map is associated with the transient anchor, the cell topology map defining the relative locations of access nodes having connectivity to the transient anchor; the cell topology map further identifying one or more border access nodes of the access nodes at the border of the aggregate radio coverage area defined by the access nodes; the topology map further identifying the border of border access nodes physically adjacent to the border nodes; and wherein the logic is further operable to:

determine that the optimized path is to be used for the communications session, if the identified access node is not a border access node or a border of border access node; else, determine that a default path including the permanent anchor of a home network of the first endpoint is to be used for the communications session.

11. The logic of claim 8 wherein the logic is further operable to forward the message to the home network of the first endpoint; and receive from a home network policy server of a first endpoint associated with a transient anchor of a visited network one or more policy rules relating to the communications session between the first endpoint and a second endpoint.

12. The logic of claim 8 wherein the logic is further operable to responsive to a roam event of the first endpoint from the identified access node to a second access node, conditionally signal the home network of the first endpoint to re-negotiate a path for the communications session based at least in part on the location of the second access node relative to the mobility border associated with the transient anchor.

13. The logic of claim 8 wherein the logic is further operable to receive from a home network policy server of the first endpoint associated with the transient anchor of the visited network one or more policy rules relating to a communications session between the first endpoint and the second endpoint.

14. The logic of claim 8 wherein the logic is further operable to
configure the transient anchor to forward the packet flows of the communications session between the first end point and the second endpoint along the optimized path, if the packet flows are to be routed along the optimized path;
configure the transient anchor to forward the packet flows of the communications session between the first end point and the second endpoint to a permanent anchor of a home network of the first endpoint, if the flows are not to be routed along the optimized path.

15. A method comprising
forwarding packet flows of a communications session between a first end point and a second endpoint along an optimized path, wherein the first endpoint is connected to a first access node associated with a transient anchor of a visited network, and wherein the optimized path bypasses a permanent anchor of a home network of the first endpoint;
responsive to a roam event of the first endpoint from the first access node to a second access node, conditionally signaling the home network of the first endpoint to re-negotiate a path for the communications session based at least in part on the proximity of the second access node relative to a mobility border associated with the transient anchor, wherein the mobility border defines a coverage boundary beyond which handoffs of active communications sessions of the first end point traversing the optimized communications path from the transient anchor to a second transient anchor is unavailable.

16. The method of claim 15 wherein the mobility border is defined by a physical radio coverage border comprising individual radio coverage areas of a plurality of access nodes associated with the transient anchor.

17. The method of claim 15 further comprising
accessing a cell topology map associated with the transient anchor, the cell topology map defining the relative locations of access nodes having connectivity to the transient anchor; the cell topology map further identifying one or more border access nodes of the access nodes at the border of the aggregate radio coverage area defined by the access nodes; the topology map further identifying the border of border access nodes physically adjacent to the border nodes; and wherein the determining step includes
signaling the home network to re-negotiate the path, if the second access node is a border access node or a border of border access node.

18. The method of claim 15 further comprising
forwarding packet flows of a communications session between a first end point and a second endpoint to a permanent anchor of a home network of the first endpoint, wherein the first endpoint is connected to a first access node associated with a transient anchor of a visited network; and
responsive to a roam event of the first endpoint from the first access node to a second access node, conditionally signaling an option to establish an optimized path for the communications session to the home network of the first endpoint based at least in part on the location of the second access node relative to a mobility border associated with the transient anchor.

19. Logic encoded in one or more non-transitory, tangible media for execution and when executed operable to:
forward packet flows of a communications session between a first end point and a second endpoint along an optimized path, wherein the first endpoint is connected to a first access node associated with a transient anchor of a visited network, and wherein the optimized path bypasses a permanent anchor of a home network of the first endpoint;
responsive to a roam event of the first endpoint from the first access node to a second access node, conditionally signal the home network of the first endpoint to re-negotiate a path for the communications session based at least in part on the proximity of the second access node relative to a mobility border associated with the transient anchor, wherein the mobility border defines a coverage boundary beyond which handoffs of active communications sessions of the first end point traversing the optimized communications path from the transient anchor to a second transient anchor is unavailable.

20. The logic of claim 19 wherein the mobility border is defined by a physical radio coverage border comprising individual radio coverage areas of a plurality of access nodes associated with the transient anchor.

* * * * *